Sept. 20, 1966 P. L. M. VAN BERKEL 3,274,337

DEVICE FOR READING SIGNALS FROM A TAPE

Filed Sept. 26, 1962 4 Sheets-Sheet 1

INVENTOR.
PETRUS L.M. van BERKEL
BY
Hugh A. Kirk
ATT'Y.

Sept. 20, 1966 P. L. M. VAN BERKEL 3,274,337

DEVICE FOR READING SIGNALS FROM A TAPE

Filed Sept. 26, 1962 4 Sheets-Sheet 2

INVENTOR.
PETRUS L. M. van BERKEL
BY Hugh A. Kirk
ATT'Y.

Sept. 20, 1966 P. L. M. VAN BERKEL 3,274,337

DEVICE FOR READING SIGNALS FROM A TAPE

Filed Sept. 26, 1962 4 Sheets-Sheet 3

INVENTOR.
PETRUS L.M. van BERKEL
BY Hugh A Kirk
ATT'Y.

Sept. 20, 1966 P. L. M. VAN BERKEL 3,274,337

DEVICE FOR READING SIGNALS FROM A TAPE

Filed Sept. 26, 1962 4 Sheets-Sheet 4

INVENTOR.
PETRUS L. M. van BERKEL
BY Hugh A. Kirk
ATT'Y

United States Patent Office 3,274,337
Patented Sept. 20, 1966

3,274,337
DEVICE FOR READING SIGNALS FROM A TAPE

Petrus Ludovicus Maria van Berkel, Voorburg, Netherlands, assignor to De Staat der Nederlanden, ten deze Vertegenwoordigd door de Directeur-Generaal der Posterijen, Telegrafie en Telefonie, The Hague, Netherlands Filed Sept. 26, 1962, Ser. No. 226,358
Claims priority, application Netherlands, Oct. 2, 1961, 269,828
7 Claims. (Cl. 178—17)

The invention relates to a device for reading signals from a tape, intended for a telegraph transmitter having a means for repetition of mutilated signals or signal groups. The device must feed the signals into a simplex system for transmitting signals, or signal groups with regular pauses between each signal and signal groups. In prior art systems of this kind, transmitting memories are used in order to repeat the symbols already transmitted, in case there is a request for repetition of said signals or signal groups.

The invention is based on the idea that it is possible to eliminate such memory apparatus by making the perforated tape itself, which is used in the tape transmitter, give out again the information for the repeated signals. For this purpose, use is made of a plurality of reading-heads capable of giving out this information at the moment the repeated signal is to be transmitted, without first reversing or moving back the tape. According to the invention, this moving back is not effected before, but after the repetition and during one of the pauses which always occurs between each transmitted signal or group of signals. That is why the invention is directed to a system in which the signals are transmitted in spaced groups or blocks containing the same number of symbols, such as in the simplex repetition system described in U.S. patent applications Serial No. 1,313, filed January 8, 1960, now U.S. Patent No. 3,156,767 and Serial No. 94,337, filed March 8, 1961, both of which are assigned to the same assignee as the present application.

The invention is of a particular importance in systems in which the blocks are locally numbered so that the blocks are transmitted in cyclically numbered groups, such as odd and even numbered groups. For example, each time an odd numbered group is correctly received, an even numbered group is requested, which is the next group; and each time a group is received mutilated, the same numbered (i.e. odd or even) group is requested so that the block received mutilated is repeated. Thus two types of answer-back signals are used for requesting groups, namely, an even one and an odd one, and reception of the same answer-back signal twice in succession means a request for repetition and the reception of different answer-back signals in succession means an acknowledgement of the correct reception of the just transmitted block.

According to this invention there is provided two tape reading stations or heads spaced apart a distance in the direction of movement of the tape corresponding to the distance taken up by the number of symbols or signals contained in a block of signals recorded on the tape. Since the symbols received are checked blockwise, a request for repetition can only arrive at the end of a complete block where the pause between blocks occurs. Thus when it appears that a preceding block must be repeated, an immediate change-over from the trailing to the forward reading head can occur during this pause between blocks.

Then after the repetition of a repeated block, the tape is moved back during the next pause between blocks.

As a result, there is obtained a better time correspondence of the pauses and moving back of the tape, as well as a larger group length or block length and, consequently, a higher efficiency of the system together with a simplification of the transmitting apparatus. A very suitable tape transmitter for such operations is one having a smooth driving-roller and optical scanning of the holes of the tape, so that the tape can be moved forward and backward an unlimited number of times without being damaged. During the continuous rapid backward movement of the tape after a repetition, the number of transport holes are counted which correspond to that number occurring in the tape for a block of signals to stop the tape at the correct return distance. On the other hand during forward movement of the tape, each hole serves for stopping the tape, so that the forward movement is continued in steps, by successive control pulse, e.g. questioning-pulses from the radio circuit of the repetition system, or questioning-pulses from the system for the transmission of data via telegraph circuits. An application of this is in the transmission of commercial data interspersed with normal teleprinter traffic, for which the existing quality of the circuits is often insufficient, particularly when large groups of data having no internal correlation must be transmitted.

The introduction of additional protection can be had by using a self-checking code which provides the possibility of signalling the ocurrence of errors, but not of correcting them. Especially is this true in the transmission of data from perforated tape wherein the correction of signalled faults after the tape is read is prohibitively impractical.

Proceeding now to systems which have repetition devices, one can readily call on well-known techniques. However, due to the use of a simplex circuit in the present telegraph system, some essential differences with the well-known repetition system are exhibited. Thus if line circuits are used, wherein the probability of mutilations is smaller than with the probability over a radio path, it is possible to have the repetitions not occur per signal, but per group of signals. It would also be possible to have the above mentioned self-checking type protection occur not per signal, but per group of signals. Previously, this would involve the necessity of storing all the signals of a group at the receiving end in a memory until the check for correctness has been made before the group of signals could be printed or perforated. For this reason it is desirable to protect the signals one by one, e.g. by means of a three-out-of-seven or constant ratio code, so that each correctly received signal can be perforated or printed immediately.

It results from the above that at the transmitting end, a tape transmitter is required which is capable of transmitting and, if necessary, repeating, a group of signals (to fix the idea: some tens of signals). Thus the most obvious solution consists in building a tape transmitter capable of transmitting a group of signals at the desired speed and, moreover, moving back the relevant piece of tape at a much higher speed. It has been mentioned above that each transmitted block should begin with a symbol indicating whether a fresh block is to be transmitted or that the last transmitted block is to be repeated. The moving back can then be timed to occur with this first signal. Since there is a limit to the speed at which the moving back can occur, the limited length of this first signal implies that the tape can be moved back over a small distance during the duration of the first signal, and the length of this first signal in its turn limits the length of the whole block.

So according to the invention, in a circuit arrangement of the above mentioned kind use is made of a tape transmitter having two reading stations spaced apart by a distance corresponding to a group of signals on the tape. The tape passes these stations successively, and the station which reads the tape first is normally active as long as no errors occur. However a changeover to the other station that reads the tape last is effected in the case of a request for the repetition of a group already transmitted that was not correctly received, so that this group to be repeated can be scanned immediately, and also if desired, be preceded by a group characteristic. Then after this group is repeated the switching-back to the first station is effected during a next pause between groups when the tape also is moved back.

In the device according to the invention the time interval available for moving back the tape is equal to twice the length of an answer-back signal increased by twice the propagation time of the circuit. Thus the minimum time available for moving back the tape is equal to the duration of the transmission of the answer-back signal and the reception thereof.

The above mentioned and other features and objects of this invention and the manner of attaining them will become more apparent and the invention itself will be understood best by reference to the following description of an embodiment of the invention taken in conjunction with the accompanying drawings, wherein:

FIG. 1 shows how one station according to the prior art had to scan the tape and repeat the scanning of the tape (third block) after a request for repetition of the second block, which must include a moving back of the tape before it could be rescanned.

Figure 1:
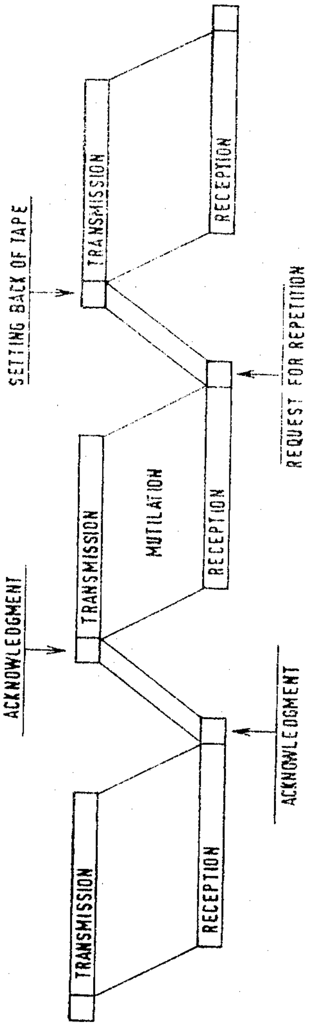
FIG. 1 is a schematic time diagram of the known prior art repetition method.
Figure 2:
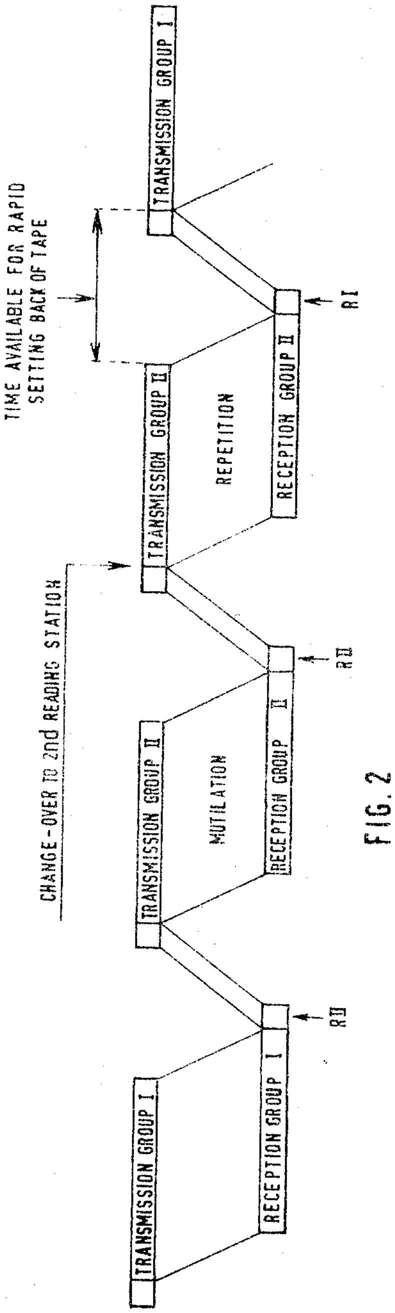
FIG. 2 is a schematic time diagram similar to FIG. 1, but of the repetition method according to the present invention.
Figure 3:
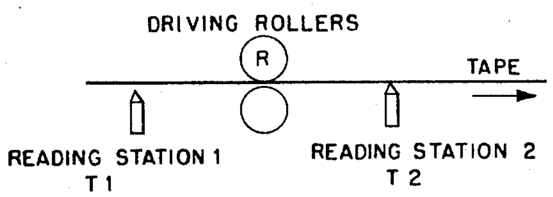
FIG. 3 shows diagrammatically the relative location of the two tape reading-stations along the tape according to this invention.

FIG. 2 is a schematic time diagram similar to FIG. 1 for the system of this invention having two or three or more spaced reading or scanning stations or heads. In this system groups I and II of signals are transmitted alternately, but group II is transmitted twice due to a disturbance bringing about a request for its repetition, which, when arriving at the information-sending station results in a change-over to the second reading-station or head. This second reading-station repeats the group II without loss of time, caused by first moving back the tape, in that after repetition, an uninterrupted time is available for rapidly moving back the tape. The location of these two spaced reading stations or heads can be seen in FIGS. 3 and 4, which stations lie at a distance which, measured in symbols, is equal to the space or length required on the tape for the content of one information block of signals.

In an embodiment of this invention, use is made of a tape transmitter having a smooth roller R, driven by a motor M (see FIG. 5) having a printed circuit armature. Such a motor has the advantage that its direction of rotation is reversible with only a very small delay.

Figure 5:
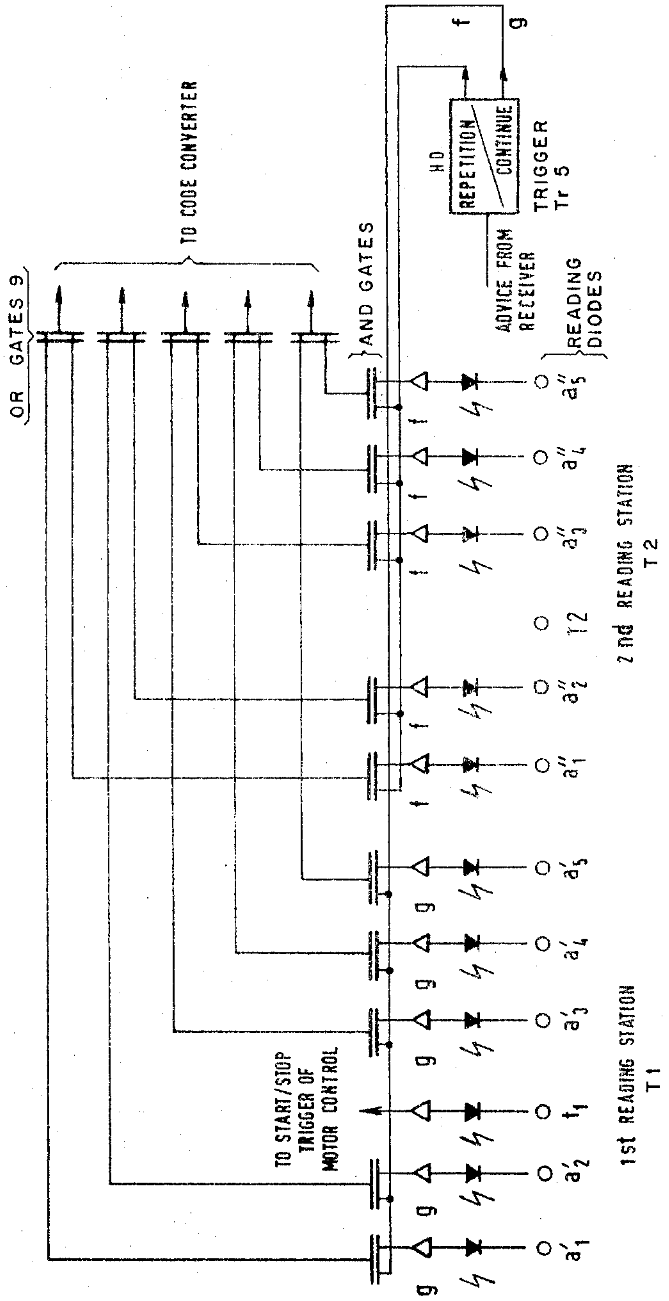
FIG. 5 is a schematic wiring diagram of a circuit for the change-over of one reading station to the other according to this invention.

FIG. 5 shows the circuit arrangement of the diodes of the two reading-stations or heads T1 and T2, comprising the AND-gates for the rapid change-over from one station to the other, and a number of OR-gates for passing the readings of the photo diodes $a'_1$ to $a'_5$ of station T1 or the readings of the photo diodes $a''_1$ to $a''_5$ of station T2.

Moreover there is an HD repetition trigger Tr5 for delivering *f* or *g* criteria voltages, which criteria voltages determine whether the diodes of forward station T2 for repetition or those of trailing station T1 for normal correct reading will be active.

Figure 6:
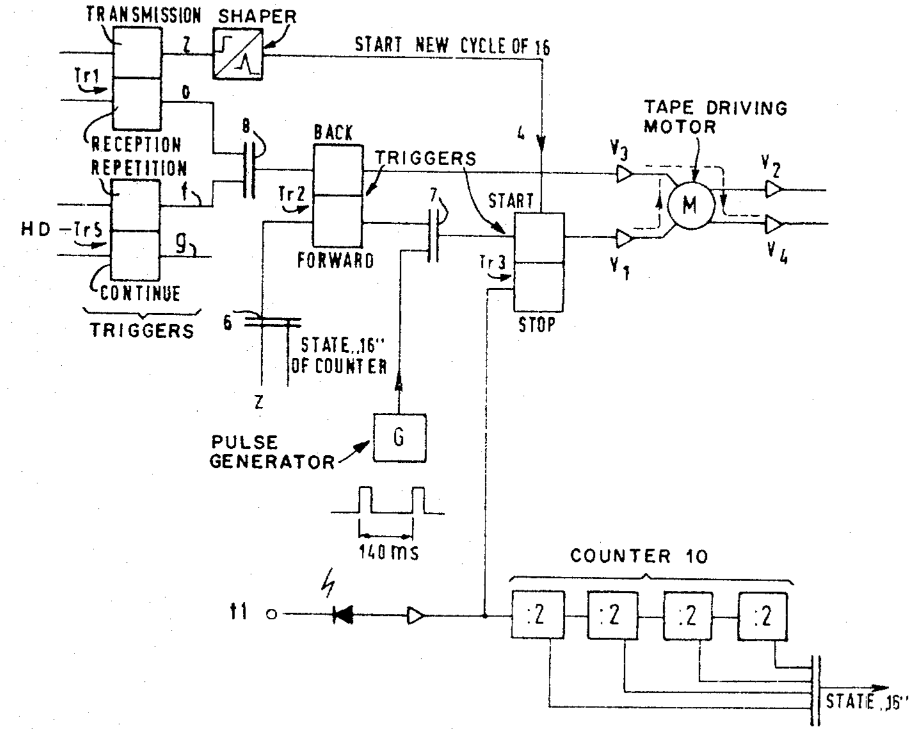
FIG. 6 is a schematic block wiring diagram for controlling the driving motor for the forward and backward movement of the tape according to the present invention.

The HD repetition trigger Tr5 also is shown in FIG. 6, in which it forms part of the control of the motor M. This motor M is also under the influence of the pulse generator G, which controls the start-stop trigger Tr3 through the intermediary of the AND-gate 7.

In the position "transmission" the motor M always runs step by step (transmission of an information block).

In the position "reception" (the transmitter looks out on the line for an answer-back signal from the receiver or is receiving this answer-back signal; so this is the pause between two blocks), the motor M normally stands still, but it may also turn backward continuously (for 16 symbols), when the "repetition/continue" HD trigger Tr5 is in its "repetition" state. To sum up: in the pause between two blocks, after the repetition of a black, the motor M rapidly and continuously moves back the tape a distance corresponding to 16 symbols on the tape or that for one block or group of signals.

In this FIG. 6, the 16-state counter 10 counts transport holes in the tape corresponding to each signal or symbol on the tape, and then blocks the pulse generator G when in its 16th state from operating the start-stop trigger Tr3 until the "transmission/reception" trigger Tr1 assumes the "transmission" state again.

In detail the working of the forward and backward movement of the motor M, and of the scanning of the tape for normal transmission and for repetition, is as follows: If in FIG 6 the trigger Tr1 is in the transmitting state and also if, and independent thereof, the counter 10 is in its state "16," the trigger Tr2 will be put in the "forward" state, by a signal applied via the OR-gate 6. When under these circumstances at some moment the pulse generator G which delivers pulses with a repetition period of 140 milliseconds (ms.), passes a pulse via the AND-gate 7 to the trigger Tr3, the latter assumes the "start" state, due to which the path of the amplifiers $v_1$ and $v_2$ is opened and the motor M starts in a forward direction.

Figure 4:
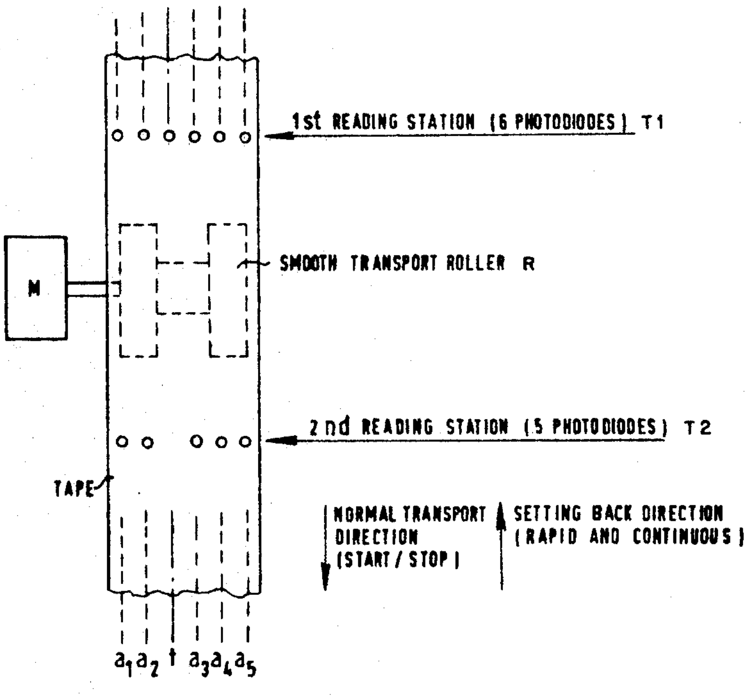
FIG. 4 is a schematic underside view of the tape and station shown in FIG. 3.

As a consequence of this, the tape is moved forward until the next transport hole in the row *t* (see FIG. 4) is read, at which moment this hole causes an impulse to occur at station T1 (FIG. 5). This impulse according to the circuit in FIG. 6, puts the trigger Tr3 in the "stop" state, thus cutting the path of the amplifiers $v_1$ and $v_2$, stopping the motor M, and at the same time causing the counter 10 to make a step forward. At this moment the symbol or signal contained in the information holes in the rows $a_1$ to $a_5$ in FIG. 4 are read at station T1 by the corresponding photo-diodes $a'_1$ to $a'_5$ (see FIG. 5) and passed to the code converter via the OR-gates 9. When the counter 10 has reached the state "16," the trigger Tr2 via AND-gate 7 prevents the timing-pulse delivered by the pulse generator G from reaching the trigger Tr3, and the trigger Tr1 is put in its receiving-state since the block is completed and a pause must follow.

If in this pause the answer-back signal for erroneous reception is received, the HD repetition trigger Tr5 will assume the "repetition"-state; at the same time the trigger Tr1 will assume the "transmission"-state, until after the repetition of the block, and then it passes to the "reception"-state again as controlled by the counter 10. At that moment trigger Tr5 is put into its "repetition"-state, it causes the trigger Tr2, via the AND-gate 8, to assume the "backward"-state due to which the path of amplifiers $v_3$–$v_4$ is opened and the motor M moves the tape back 16 holes or symbols. Then the counter 10 reaches its 16th state again and, via the gate OR 6 switches the trigger Tr2 to its "forward"-state again.

Next trigger Tr3 passes to the "start"-state again, when trigger Tr1 assumes the "transmission"-state again, because at that moment a pulse is passed via the conductor 4 from trigger T*r*1 to trigger T*r*3.

While I have illustrated and described what I regard to be the preferred embodiment of my invention, nevertheless it will be understood that such is merely exemplary and that numerous modifications and rearrangements may be made therein, without departing from the essence of the invention, I claim:

1. A tape reading mechanism for a simplex telegraph circuit with automatic error detection and correction means, said tape containing groups of the same number of symbols which symbols are individually and successively transmitted by the telegraph circuit according to a protected code so that errors in each symbol can be immediately detected upon reception, said groups of symbols being associated with characteristic whereby between each group one of two answer-back signals are transmitted to indicate correct and incorrect reception of each group for controlling said error correction means, said mechanism compising:

(A) means (T*r*3) for driving said tape forwardly in steps for successively reading each symbol of each group, (B) means (*t*1) for stopping said driving means at the end of each group for the transmission of one of two answer-back signals, (C) a trailing reading means (T1) and at least one forward reading means (T2) for reading said tape, each reading means being spaced apart from the other reading means along said tape a distance corresponding to that required for recording one group of symbols on said tape, (D) means (10) for counting the number of symbols in each group, (E) means (T*r*1) for controlling said trailing reading means when an answer-back signal indicating correct reception has been received, (F) means (HD, *g*) for immediately switching to and controlling said forward reading means when an answer-back signal indicating incorrect reception has been received, (G) means (HD, *f*) for switching back to said trailing reading means after said group of signals has been repeated and the correct reception indicating answer-back signal therefor has been received, and (H) means (T*r*2) for controlling said driving means controlled by said counting means for reversing said tape the distance corresponding to said group, simultaneously with the switching back to said trailing reading means.

2. A mechanism according to claim 1 wherein said protected code comprises a constant ratio code.

3. A mechanism according to claim 1 wherein said driving means for said tape comprises a smooth driving roller.

4. A mechanism according to claim 1 wherein said tape has a plurality of holes, one for each symbol marked thereon, and wherein said reading means includes means for scanning said holes to operate said counting means.

5. A mechanism according to claim 1 wherein said driving means for stepping said tape comprises a pulse generator.

6. A mechanism according to claim 1 wherein said means for reversing said tape comprises means for continuously moving said driving means.

7. A mechanism according to claim 1 wherein said reading means comprise optical scanning means.

References Cited by the Examiner

UNITED STATES PATENTS

| | | | |
|---|---|---|---|
| 2,371,367 | 3/1945 | Warburton | 178—17 |
| 2,989,590 | 6/1961 | Deboo | 178—17 |
| 2,997,697 | 8/1961 | MacAdam | 340—174.1 |

NEIL C. READ, *Primary Examiner.*

T. A. ROBINSON, *Assistant Examiner.*